(12) United States Patent
Banas et al.

(10) Patent No.: US 8,783,242 B1
(45) Date of Patent: Jul. 22, 2014

(54) CHARCOAL GRILL HAVING RE-CHARGEABLE CHARCOAL FEED FOR CONTINUOUS OPERATION

(75) Inventors: Matthew Ronald Banas, Tampa, FL (US); Paul A. Witiak, Brooksville, FL (US)

(73) Assignee: University of South Florida, Tampa, FL (US)

( * ) Notice: Subject to any disclaimer, the term of this patent is extended or adjusted under 35 U.S.C. 154(b) by 856 days.

(21) Appl. No.: 12/879,062

(22) Filed: Sep. 10, 2010

Related U.S. Application Data (60) Provisional application No. 61/241,186, filed on Sep. 10, 2009.

(51) Int. Cl.
*A47J 37/07* (2006.01)
*F24B 13/04* (2006.01)

(52) U.S. Cl.
CPC .............. *F24B 13/04* (2013.01); *A47J 37/079* (2013.01)
USPC ......... 126/25 B; 126/223; 126/25 R (58) Field of Classification Search
CPC ..... A47J 37/07; A47J 37/0768; A47J 37/079; F24B 13/00; F24B 13/04
USPC ....... 126/25 B, 223, 327, 25 R, 218; 110/327
See application file for complete search history.

(56) References Cited

U.S. PATENT DOCUMENTS

| | | | | |
|---|---|---|---|---|
| 361,006 | A * | 4/1887 | Girtanner ..................... | 126/223 |
| 1,705,548 | A * | 3/1929 | Sydow ......................... | 110/116 |
| 1,974,789 | A * | 9/1934 | Angell .......................... | 414/217 |
| 2,004,533 | A * | 6/1935 | Maynard ........................ | 60/374 |
| 3,062,200 | A * | 11/1962 | Miller .......................... | 126/25 B |
| 3,450,123 | A * | 6/1969 | Tidd ............................ | 126/25 R |
| 3,708,078 | A * | 1/1973 | Clements ....................... | 198/524 |
| 3,717,137 | A * | 2/1973 | Moline et al. ................ | 126/25 B |
| 3,799,141 | A * | 3/1974 | Simmer ........................ | 126/25 B |
| 3,884,214 | A * | 5/1975 | Duncan ........................ | 126/25 B |
| 4,287,874 | A * | 9/1981 | Michael ........................ | 126/242 |
| 4,474,117 | A * | 10/1984 | Marollaud ..................... | 110/109 |
| 5,144,939 | A * | 9/1992 | Christopherson ........... | 126/25 R |
| 5,154,159 | A * | 10/1992 | Knafelc et al. .............. | 126/25 R |

(Continued)

FOREIGN PATENT DOCUMENTS

AU 3578271 A1 * 5/1973

*Primary Examiner* — Kenneth Rinehart
*Assistant Examiner* — Sharla Magana
(74) *Attorney, Agent, or Firm* — Ronald E. Smith; Andriy Lytvyn; Smith & Hopen, P.A.

(57) ABSTRACT

A charcoal grill includes a base for holding charcoal, support legs, and a lid mounted to the base. A metal band, having an opening formed therein, encircles the base. A box is secured to the metal band in registration with the metal band opening. The box includes a top wall and an opening formed in the top wall. The box has an open, ram-receiving back end and an open front end in open communication with the metal band opening. A chimney holds charcoal until it is ready to be used. A user inverts the chimney to charge charcoal into the box through the top wall opening. A ram inserted through the back end of the box slides the charcoal into the base through the metal band opening. In this way, charcoal is added to the apparatus when the lid is closed and before a prior charge of charcoal is consumed.

7 Claims, 6 Drawing Sheets

(56) References Cited

U.S. PATENT DOCUMENTS

| | | | |
|---|---|---|---|
| 5,197,684 A * | 3/1993 | Bihlet et al. | 241/283 |
| 5,251,607 A * | 10/1993 | Traeger et al. | 126/25 R |
| 5,638,807 A * | 6/1997 | Flamenbaum | 126/25 B |
| 5,768,977 A * | 6/1998 | Parris et al. | 99/340 |
| 6,675,794 B1 * | 1/2004 | Yang | 126/25 R |
| 6,827,076 B2 * | 12/2004 | Crawford et al. | 126/25 R |
| 6,928,935 B2 * | 8/2005 | Pretzsch et al. | 110/116 |
| 8,171,926 B2 * | 5/2012 | Chang | 126/9 R |
| 8,267,078 B2 * | 9/2012 | Kuntz | 126/7 |
| 2012/0073559 A1 * | 3/2012 | Mize | 126/25 B |

* cited by examiner

CHARCOAL GRILL HAVING RE-CHARGEABLE CHARCOAL FEED FOR CONTINUOUS OPERATION

CROSS REFERENCE TO RELATED APPLICATIONS

This application claims priority to currently pending U.S. Provisional Patent Application No. 61/241,186, filed Sep. 10, 2009, which is herein incorporated by reference.

FIELD OF THE INVENTION

This invention relates, generally, to charcoal grills. More particularly, it relates to a grill to which charcoal can be added without opening the grill.

DESCRIPTION OF THE PRIOR ART

Charcoal grills typically have a bottom part that holds charcoal therein and a lid that closes so that the grilling may take place in a wind-free environment. The food to be grilled is deposited atop a grille that is positioned above the charcoals. The grille is mounted to the bottom part of the structure so that it and the food sitting atop it are not disturbed when the lid is opened or closed.

One problem with these well-known conventional charcoal grills is that the grille and the food atop it must be removed if the charcoal in the bottom of the grill burns out and all of the food has not yet been cooked. Moreover, additional charcoal is needed before the initial charge of charcoal burns out if an optimal grilling temperature is to be maintained.

Small family outings rarely require a second or third batch of charcoal but where large numbers of people are being served, where additional batches of charcoal may be needed, it is problematic to unload the food, remove the grille, add more charcoal, light it, wait for it to be ready, and then return the grille to its mount, return the food to the grille, and close the lid so that the cooking process can continue as before. The interruption in cooking time can be substantial because it takes quite a few minutes for a new batch of charcoal to be readied.

Thus there is a need for a charcoal grill that enables a user to add charcoal thereto without opening the grill and without interrupting the cooking process in any way.

There is a need as well for a charcoal grill that enables a user to add charcoal thereto that is ready to be used as a source of heat so that the cooking process is not interrupted by a need to wait until the additional charcoal is ready.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an apparatus and method for continuous, uninterrupted charcoal grilling is now met by a new, useful, and non-obvious invention.

The inventive structure is a charcoal grill apparatus that includes a base for holding charcoal, a lid detachably mounted to the base, an annular metal band that is interposed between the lid and the base, a box secured to the annular metal band, a chimney that is supported by the box, and a ram that shoves charcoal in the hollow interior of the box into the base through an opening formed in the metal band.

The box has a top wall, a box opening formed in the top wall, a bottom wall, and a pair of sidewalls that collectively define a hollow interior. The box has an open front and an open back end; the back end is in open communication with the opening formed in the annular metal band.

The chimney is adapted to hold a quantity of charcoal, including charcoal that has been ignited preparatory to use of the charcoal as a heat source for cooking.

The ram has an open position where it is substantially withdrawn from the hollow interior of the box, thereby enabling burning charcoal to be charged from the chimney into the hollow interior of the box through the box opening formed in the top wall of the box.

The ram has a closed position where it is substantially fully inserted into the hollow interior of the box. The box opening formed in the top wall of the box is closed when the ram is in its closed position. When the ram is moved from its retracted to its extended or closed configuration, it shoves all burning coals in the box through the opening formed in the annular metal band into the interior of the base of the grill.

In this way, charcoal is added to the apparatus when the lid is closed and before a prior charge of charcoal is consumed so that a cooking process is not interrupted and so that an optimal cooking temperature may be continuously maintained.

An important object of the invention is to enable a charcoal-fired grill to continue uninterrupted operation even when a charge of charcoal in the grill has been fully or partially consumed.

A closely related object is to enable the addition of charcoal to a charcoal grill without lifting the lid of the grill.

Another closely related object is to provide a means whereby charcoal can be brought to readiness outside of the grill and then introduced into the grill when ready without interrupting the cooking process.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
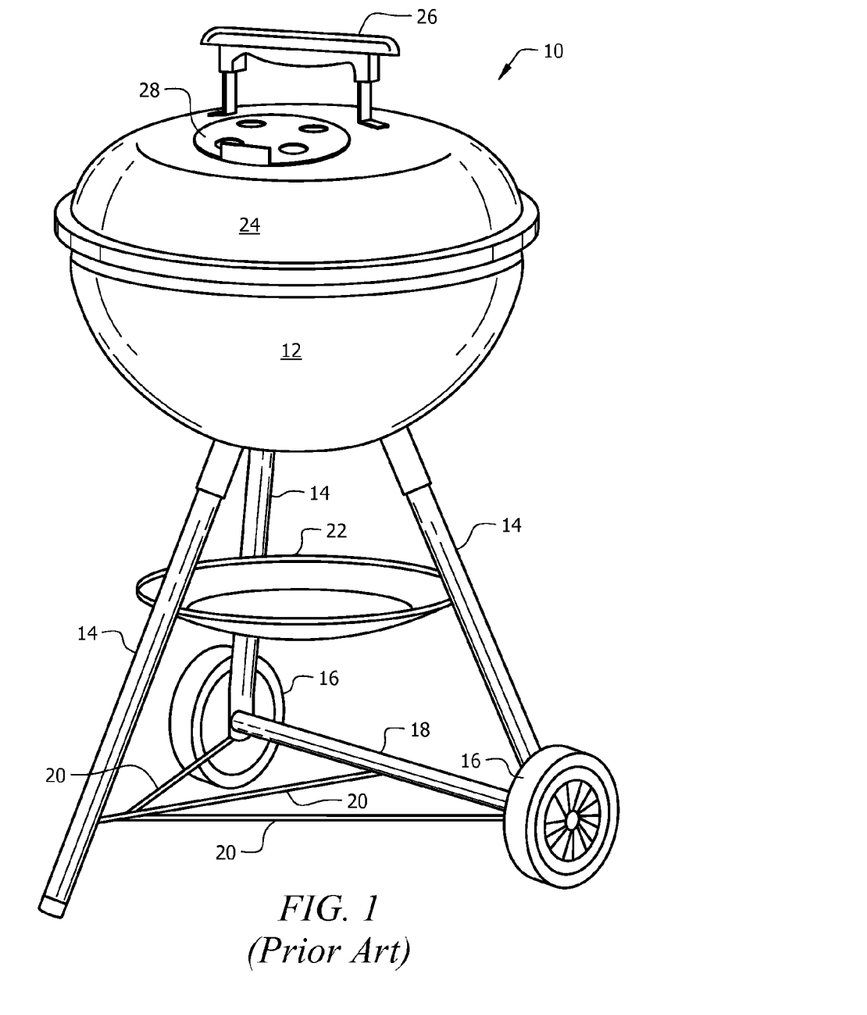
FIG. 1 is a perspective view of a prior art charcoal grill.

Referring now to FIG. 1, it will there be seen that a prior art charcoal grill is denoted as a whole by the reference numeral 10.

Conventional charcoal grill 10 includes a bottom part or base 12 supported above a ground surface by a plurality of support legs, collectively denoted 14. Wheels 16 are typically rotatably mounted to the lowermost end of two preselected legs. Brace 18 interconnects the wheeled legs and brace members 20 interconnect brace 18 and the unwheeled, longer leg. Pan-like brace 22 braces all three legs and also provides a place to store various items.

The invention is not limited to the depicted grill; it is adaptable to many other types of grills as well. For example, the shape of the metal band is changed to accommodate grills that are square or rectangular. The only requirement is that the metal band be interposed between the base and the lid of the grill.

Base 12 is adapted to hold a quantity of charcoal. When used in a conventional way, charcoal is charged into base 12 from a bag of charcoal, and the charcoal is lit. The user waits for the flames to die down before attempting to cook.

Conventional grill 10 further includes a lid or top part 24 that is hingedly or detachably connected to base 12. Although not depicted in FIG. 1, it is well-known that a food-supporting grille is supported by brackets that are mounted to base 12. As is well-known, the brackets may include stepped surfaces so that the grille can be positioned at differing heights above the charcoal.

Lid 24 includes handle 26 and a rotatably mounted vent 28. Lid 24 is typically closed as food is cooked to retain heat, block wind, and to enable the fumes inside the apparatus to soak into the food to enhance the flavor.

Figure 4:
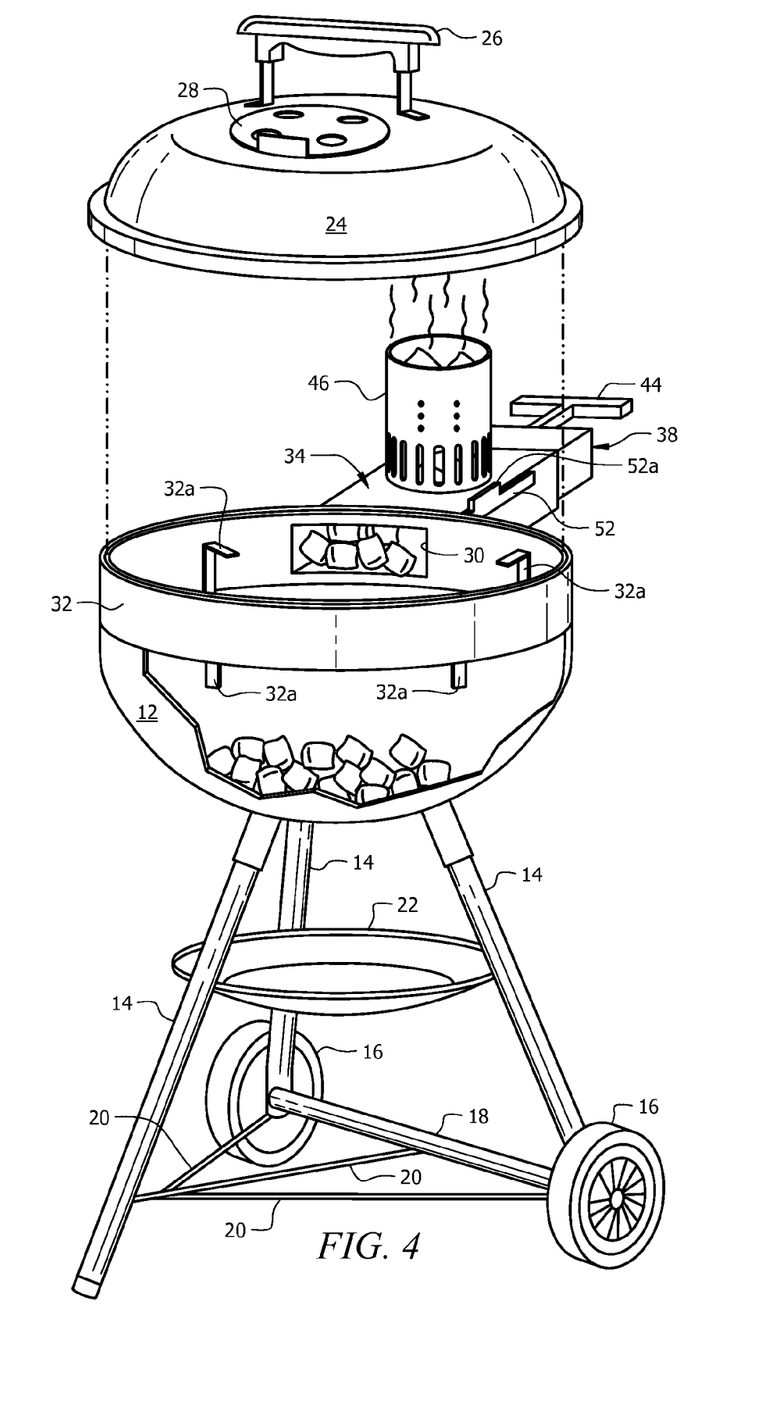
FIG. 4 is an exploded perspective and cut-away view depicting the opening formed in the annular metal band that admits burning charcoal briquettes into the interior of the charcoal grill when the novel ram is slidingly displaced from its retracted to its extended position.
Figure 5:
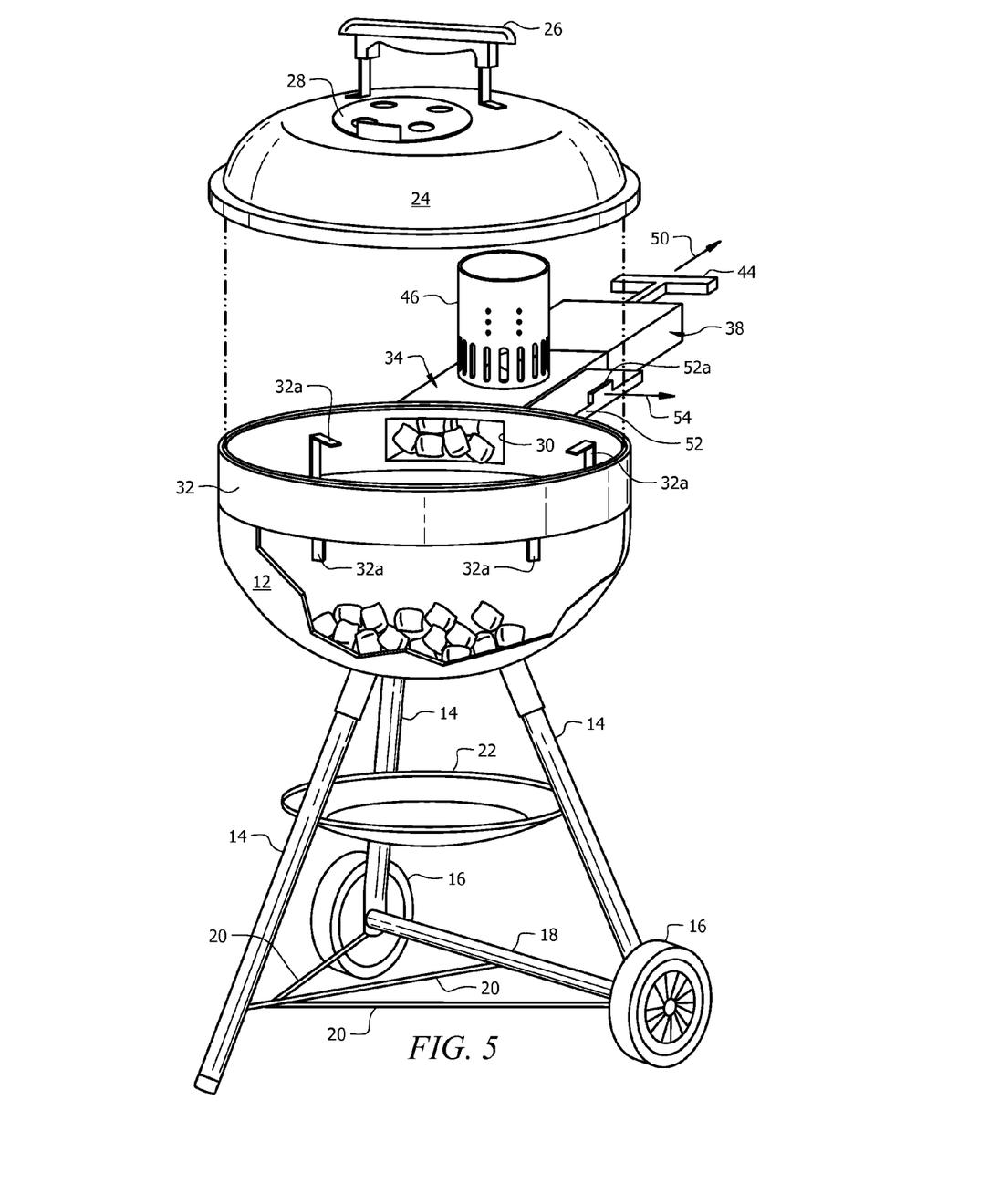
FIG. 5 is an exploded and cut-away view depicting burning charcoal briquettes in the hollow interior of the box.
Figure 6:
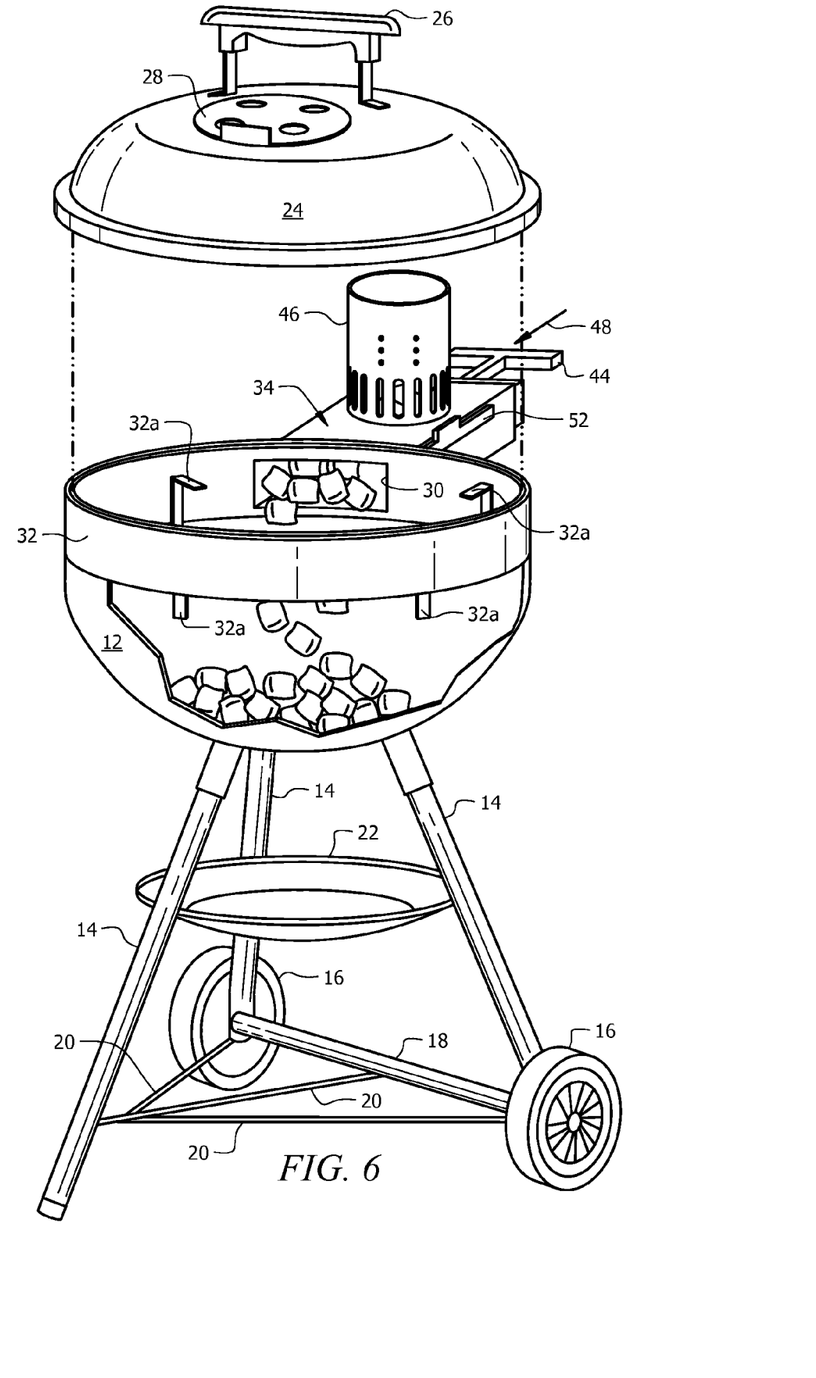
FIG. 6 is an exploded and cut-away view depicting the ramming of charcoal briquettes from the box by the ram through the opening formed in the annular metal band and into the hollow interior of the charcoal grill.

As indicated in FIGS. 4-6, opening 30 formed in annular metal band 32 is preferably rectangular in configuration.

Figure 3:
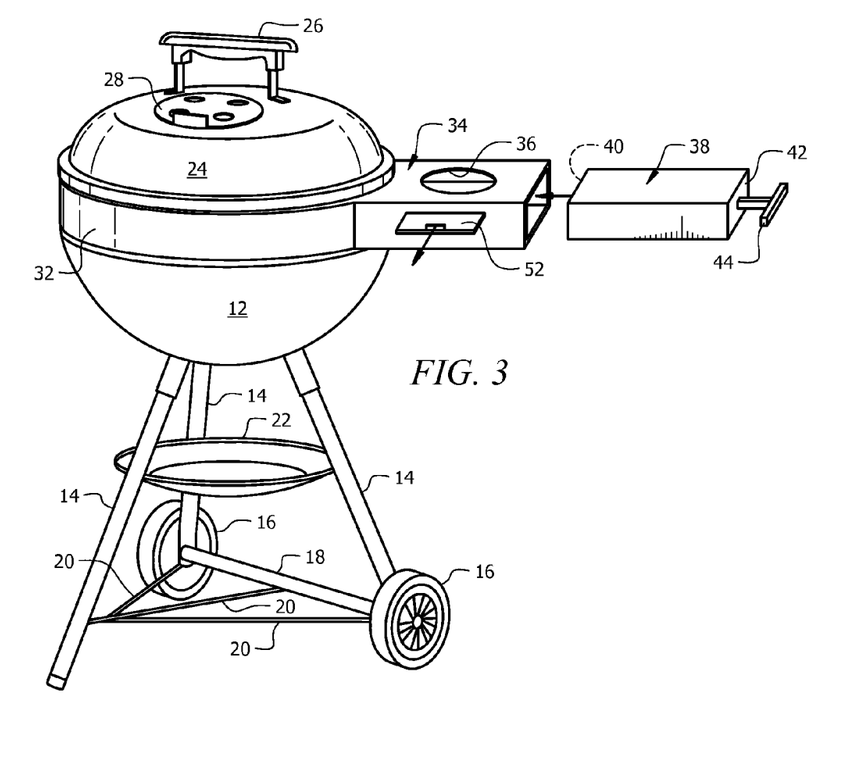
FIG. 3 is an exploded perspective view of the novel parts when secured to the prior art grill depicted in FIG. 1.

Annular metal band 32 is positioned between base 12 and lid 24 as depicted in FIG. 3. Box 34 is secured to annular metal band 32 by welding or other suitable means so that said box extends in cantilever relation thereto in parallel relation to the ground. Box 34 includes a top wall 34a, a bottom wall 34b, and side walls 34c and 34d. Opening 36 is formed in top wall 34a and is hereinafter referred to as box opening 36 to more easily distinguish it from opening 30 formed in annular metal band 32.

Brackets 32a, depicted in FIGS. 2 and 4-8, are secured to an inner surface of metal band 32 in circumferentially spaced relation to one another. They provide support for a food-supporting rack or grille, not depicted, and can be displaced vertically for height adjustment or they can be fixedly mounted and have steps formed therein to enable a grille to be supported at varying heights in a conventional, well-known way. Instead of being attached to metal band 32, they could be latched onto existing grille support brackets that form a part of conventional grills such as grill 10.

Box 34 has no front wall or back wall. Its open front end is therefore in open communication with opening 30 formed in metal band 32.

Ram 38 is a box-like device having top wall 38a and side walls 38c and 38d. No bottom wall is needed and the provision of a bottom wall would merely increase the amount of friction between ram 38 and box 34. Ram 38 includes front wall 40, back wall 42, and handle 44 that is secured to said back wall 42. Back wall 42 could be eliminated and handle 44 could be secured to the remaining structure of box 34.

Ram 38 is dimensioned so that it is slideably disposed within the hollow interior of box 34. More particularly, the depth or longitudinal extent of ram 38 is substantially equal to the depth or longitudinal extent of box 34 so that when back wall 42 of ram 38 is substantially flush with the open back end of box 34, front wall 40 of ram 38 is substantially coincident with opening 30 and all of the charcoal that had been in the hollow interior of box 34 is shoved into the hollow interior of base 12.

Box opening 36 formed in top wall 34a of box 34 is also fully closed when ram 38 is fully inserted into box 34.

Chimney 46 is preferably of cylindrical construction; it may or may not have a bottom wall depending upon the embodiment of the invention. There are three (3) embodiments, one (1) of which requires a bottom wall for chimney 46 and two (2) of which do not. Chimney 46 is open at its upper end in all three (3) embodiments.

Figure 2:
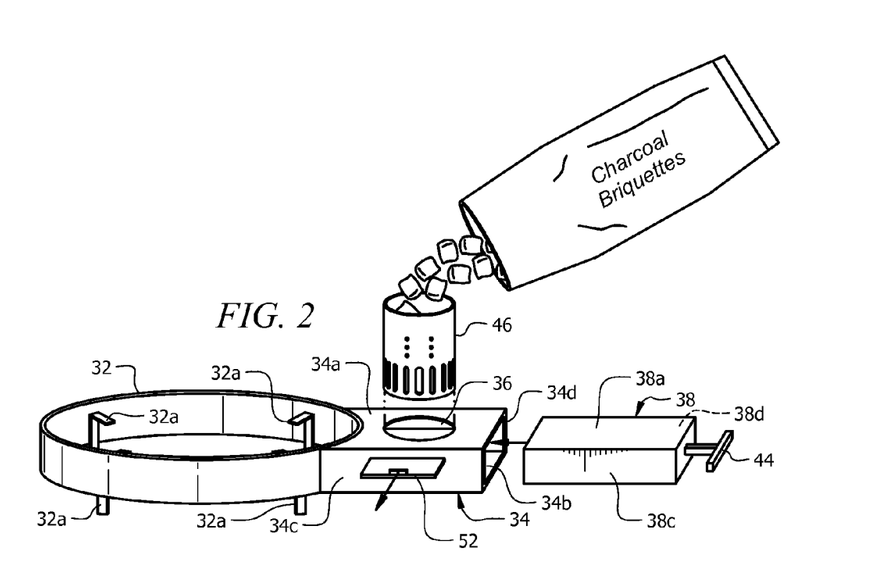
FIG. 2 is an exploded perspective view depicting the charging of charcoal briquettes into the novel chimney.

In a first embodiment, chimney 46 has a bottom wall and is placed atop top wall 34a of box 34 when box opening 36 is closed by ram 38 which is fully inserted into said box. More particularly, chimney 46 is placed atop top wall 34a when it becomes apparent that additional charcoal will be needed to finish meal preparation. Charcoal is charged into chimney 46 from a bag as depicted in FIG. 2 and said charcoal is lit in a conventional manner. It is allowed to burn in the chimney until the flames die down, indicating that the charcoal is ready for use. Chimney 46 is lifted from box 34, ram 38 is slid outwardly so that box opening 36 is open, and the charcoal in chimney 46 is poured into the hollow interior of box 34 by upending or inverting chimney 46. Gloves that insulate the wearer from heat transfer are worn during such upending. When the chimney is emptied or box 34 is full, ram 38 is fully closed, as indicated by directional arrow 48 in FIG. 6, thereby ramming the charcoal in box 34 through opening 30 into the hollow interior of grill 12 where said charcoal lands atop the charcoal that is approaching its final minutes or moments of combustion.

In this way, heat for cooking is supplied by a fresh charge of charcoal and the cooking process is not interrupted by adding new charcoal nor is the cooking process interrupted by a drop in temperature because the newly readied charcoal is added prior to complete combustion of the earlier charge of charcoal. The lid remains closed until the cooking process is complete.

In the second and third embodiments, chimney 46 is a cylinder having no bottom wall and it is not upended or handled in any way after it has been positioned atop box 34.

In the second embodiment, ram 38 is fully inserted into box 34, thereby closing box opening 36. Chimney 46 is then placed atop said closed opening and charcoal briquettes are charged into said chimney, ignited, and allowed to burn until ready for use. Handle 44 is then pulled in the direction of directional arrow 50 in FIG. 5, thereby pulling ram 38 rearwardly and opening box opening 36. The charcoal falls through said box opening 36 as depicted in said FIG. 5 and ram 38 is slid forwardly as indicated by directional arrow 48 in FIG. 6, thereby ramming the charcoal into the interior of base 12 as depicted in said FIG. 6.

In the third embodiment, depicted in FIGS. 2-6, slideable trap door 52 having handle 52a provides a closure means for box opening 36. When trap door 52 is fully closed as depicted in FIGS. 4 and 6, box opening 36 is closed, regardless of the position of ram 38. When trap door 52 is fully retracted, box opening 36 is open and any charcoal briquettes within chimney 46 will fall though box opening 36 into the hollow interior of box 34 if ram 38 is also retracted so that it does not close box opening 36. With trapdoor 52 closed, charcoal briquettes are charged into chimney 46, lit, and allowed to burn until they are ready for use. Ram 38 is retracted so that it does not block box opening 36, and trapdoor 52 is opened as indicated in directional arrow 54 in FIG. 5. This allows the briquettes to fall into box 34 and ram 38 is then advanced as indicated by directional arrow 48 in FIG. 6 and the burning briquettes are shoved into the interior of base 12.

Figures 7, 8:
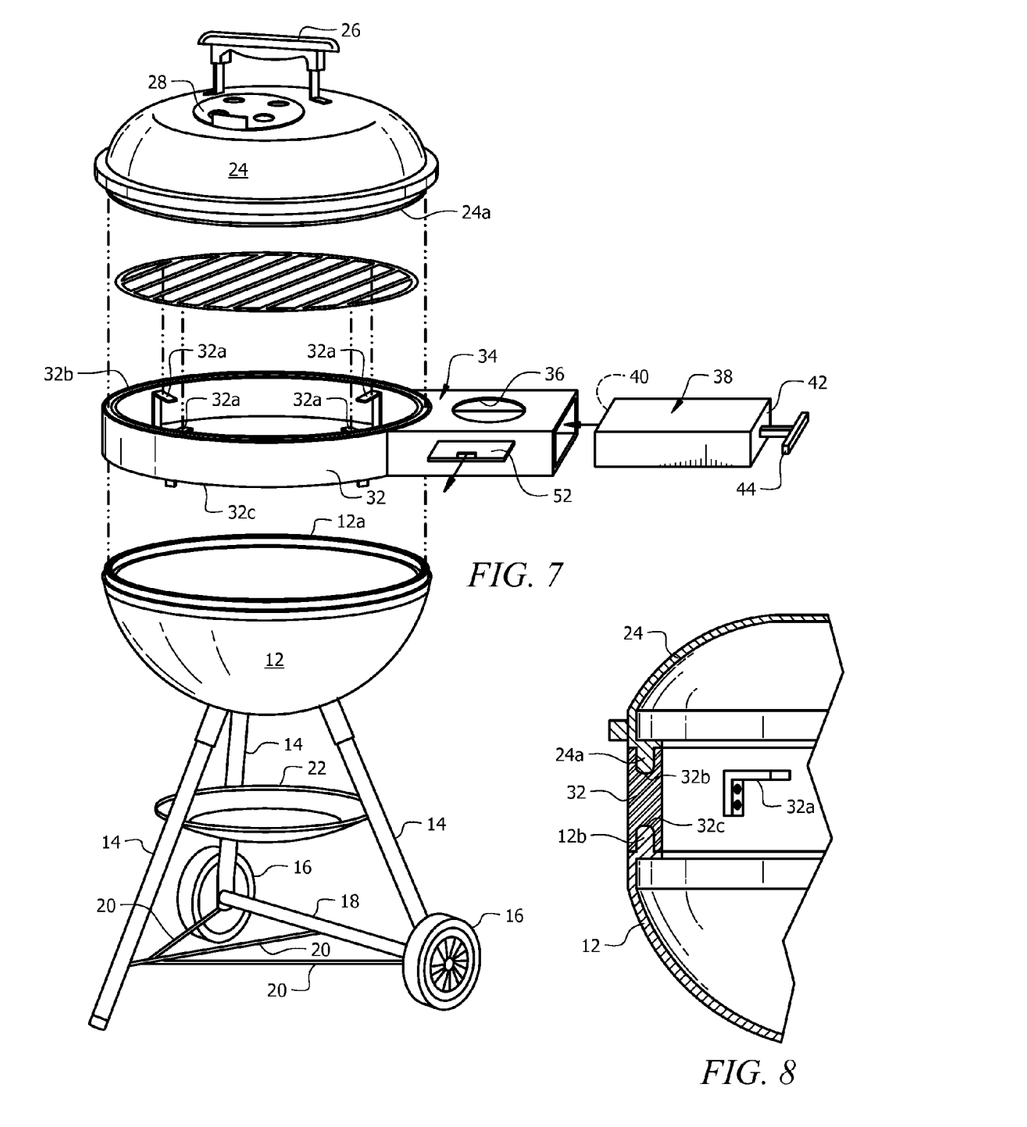
FIG. 7 is an exploded view of the novel structure.
FIG. 8 is a cut-away view depicting how the base of a conventional grill supports the metal band and how the metal band supports the lid of a conventional grill.

FIG. 7 provides an exploded perspective view depicting how the novel structure is retrofit into a conventional grill.

FIG. 8 provides a cut-away view depicting how metal band 32 has a U-shaped, downwardly opening recess formed in its bottom peripheral edge that press fittingly receives an upstanding lip formed in the rim of conventional base 12 and a U-shaped, upwardly opening recess formed in its top peripheral edge that press fittingly receives a lip that depends from the rim of conventional lid 24.

All three (3) embodiments achieve the objects of the invention and all three (3) advance the art of charcoal grilling.

One or more counterweights can be added to the novel structure to offset the weight of the chimney when filled with charcoal or a support leg or legs could be added to support box 34, or both. The lateral extent of box 34 and the height of chimney 46 may also be kept at a minimum for the same reason.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A charcoal grill apparatus, comprising:
a base for holding charcoal;
a lid;
a metal band disposed between said lid and said base, said metal band supported by said base and said lid supported by said metal band;
an opening formed in said metal band;
a hollow box secured to said metal band in cantilevered relation thereto, said hollow box being in open communication with said opening formed in said metal band;
said hollow box having a top wall, a box opening formed in said top wall, a bottom wall, and a pair of sidewalls, said walls collectively defining a hollow interior;
said box having an open front end and an open back end, said front end being in open communication with said opening formed in said metal band; and
a ram having two lateral sides and an uninterrupted front surface slideably mounted in said hollow interior of said box through said open back end of said box, wherein said front surface is in contact with said bottom wall of said hollow box and is coincident with said opening in said metal band when said ram is fully inserted into said hollow box, whereby forward sliding of said ram is configured to inject all contents of said box into said base for holding charcoal.

2. The apparatus of claim 1, further comprising:
a chimney adapted to hold a quantity of charcoal;
said chimney further adapted to hold charcoal while said charcoal is burning, preparatory to use of said charcoal as a heat source for cooking.

3. The apparatus of claim 2, further comprising:
said ram having an open, retracted configuration where it is substantially withdrawn from the hollow interior of said box, thereby enabling charcoal to be charged into the hollow interior of said box through said box opening.

4. The apparatus of claim 3, further comprising:
said ram having a closed, extended configuration where it is substantially fully inserted into the hollow interior of said box;
said box opening being closed when said ram is in said closed configuration;
said charcoal in said box being rammed through said opening formed in said metal band when charcoal is in the hollow interior of said box and said ram is displaced from its open, retracted configuration to its closed, extended configuration;
whereby charcoal is added to said apparatus when said lid is closed and before a prior charge of charcoal is consumed so that a cooking process is not interrupted.

5. The apparatus of claim 4, further comprising:
said chimney having a bottom wall;
said chimney being disposed atop said top wall of said box when said chimney contains burning charcoal briquettes;
said chimney being manually inverted when said ram is substantially withdrawn from said box so that said box opening is open;
whereby said burning charcoal briquettes are charged in the hollow interior of said box when said box opening is open and said chimney is manually inverted; and
whereby said burning charcoal briquettes are shoved into said base through said opening formed in said metal band when said ram is displaced from its retracted configuration to its extended configuration.

6. The apparatus of claim 4, further comprising:
said chimney having a cylindrical construction and having no top wall or bottom wall;
said chimney adapted to hold a predetermined quantity of charcoal briquettes when said chimney is positioned atop said box and said ram is in said closed, extended configuration so that said box opening is closed by said ram;
whereby charcoal briquettes are charged into said chimney when said chimney is positioned atop said box and said box opening is closed by said ram; and
whereby after said charcoal briquettes have been ignited and allowed to burn for a predetermined amount of time, said ram is displaced to said open, retracted configuration, thereby opening said box opening so that burning charcoal briquettes fall into said box; and
whereby said ram is then displaced from said open, retracted configuration to said closed, extended configuration, thereby shoving said burning charcoal briquettes from said box, through said opening formed in said metal band, and into the hollow interior of said base.

7. The apparatus of claim 4, further comprising:
said chimney having a cylindrical construction and having no top wall or bottom wall;
said chimney adapted to hold a predetermined quantity of charcoal briquettes when said chimney is positioned atop said box;

a slideably mounted trapdoor having a first, retracted configuration where said box opening is open;

said slideably mounted trapdoor having a second, extended configuration where said box opening is closed by said trapdoor;

whereby charcoal briquettes are charged into said chimney when said chimney is positioned atop said box and said box opening is closed by said trapdoor in said second, extended configuration;

whereby after said charcoal briquettes have been ignited and allowed to burn for a predetermined amount of time, said ram is displaced to said open, retracted configuration, and said trap door is positioned in its second, retracted position, thereby opening said box opening so that burning charcoal briquettes fall into said box; and whereby said ram is then displaced from said open, retracted configuration to said closed, extended configuration, thereby shoving said burning charcoal briquettes from said box, through said opening formed in said metal band, and into the hollow interior of said base.

* * * * *